Oct. 25, 1938.    H. E. ALLEN    2,134,467
TELEMETERING DEVICE
Filed March 31, 1937    2 Sheets-Sheet 1

INVENTOR.
HAROLD E. ALLEN
BY
ATTORNEY.

Oct. 25, 1938.    H. E. ALLEN    2,134,467
TELEMETERING DEVICE
Filed March 31, 1937    2 Sheets-Sheet 2
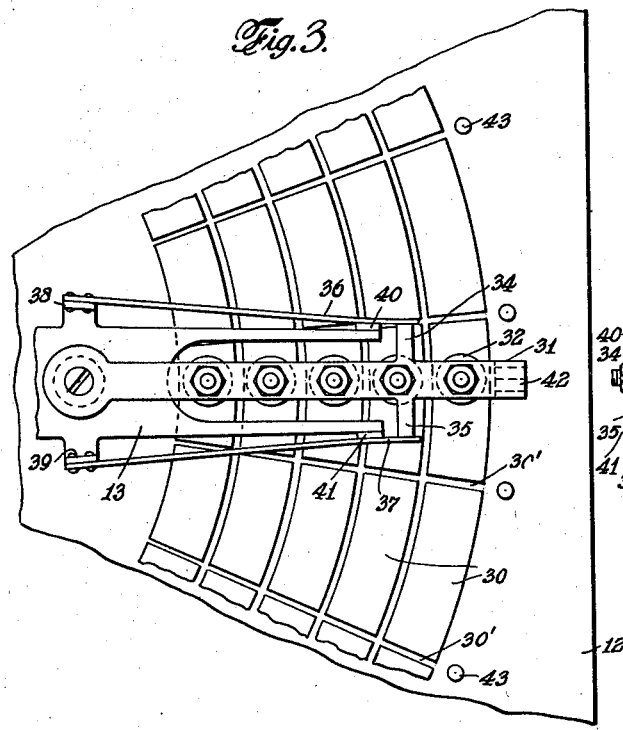
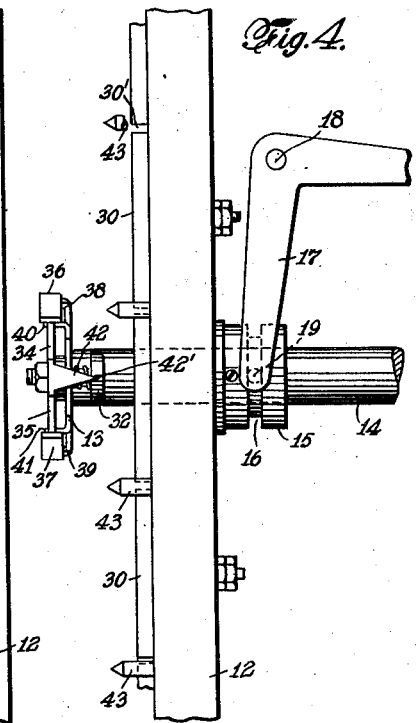
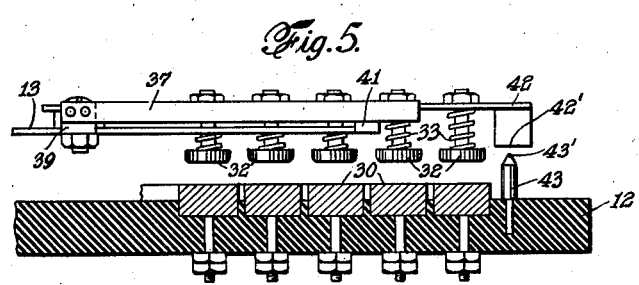
INVENTOR.
HAROLD E. ALLEN
BY
ATTORNEY.

Patented Oct. 25, 1938

2,134,467

UNITED STATES PATENT OFFICE 2,134,467

TELEMETERING DEVICE

Harold E. Allen, Waterbury, Conn., assignor to The Bristol Company, Waterbury, Conn., a corporation of Connecticut Application March 31, 1937, Serial No. 134,061

3 Claims. (Cl. 177—351)

This invention relates to telemetering or remote-indicating devices, and more particularly to a device of the type wherein it is required to display indicia, letters or numerals, or groups of the same, representative of various values as determined by a directly deflecting measuring element. The magnification of scalar magnitudes for display purposes is exemplified in "giant dials", as used on some forms of public clocks, thermometers, etc., and in connection with pressure gauges, flow meters, and wattmeters in power house practice. In such cases a scalar magnitude, while magnified, is exhibited in the form of another scalar magnitude, to be determined by the position of a pointer or index relative to a graduated scale. The display of indicia, such as numerals and letters in response to definite impulses or circuit combinations, with which this invention is directly concerned, may be exemplified, for example, in such devices as electric cab-calling systems, and in some forms of stock-quotation boards.

It is an object of this invention to provide means whereby a magnitude, measured as a scalar quantity, may be expressed as a definite corresponding group of indicia.

It is a further object of the invention to provide means whereby such indicia may be displayed in a large size and suited to public exhibition.

Another object lies in the provision of means to prevent the possibility of confusion in indicia displayed, owing to the measuring element occupying a "neutral" point.

A still further object of the invention lies in the provision of means whereby the displayed indicia may be located at a point more or less remote from the vicinity of the measuring unit.

In carrying out the invention, provision is made for measuring the respective values of a variable, the said values being displayed by an electrically actuated display device through the operation of a suitable transmitting instrument associated with the means for measuring the values of the variable. An electric circuit including a source of power connects the said transmitting mechanism with suitable receiver apparatus including an electric motor whose operation is controlled by said circuit; and a selector means is positioned thereby to assume various positions in accordance with the location of a deflecting pointer or the like of the means measuring the value of the variable, the selector means in turn effecting the display of the desired indicia or the like in response to the transmissions as thus determined by the measuring means. Provision is made for rendering the selector means effective only periodically for the display of the selected indicia, and for then freeing said selector means for resetting thereof as may be required.

The nature of the invention, however, will best be understood when described in connection with the accompanying drawings, in which:

Fig. 3 is a fragmentary front elevation, on an enlarged scale, of a portion of the selector panel and of a traveling arm adapted to coact therewith.

Fig. 4 is a fragmentary side elevation of the same.

Fig. 5 is a fragmentary side view, partly in section, of the selector with traveling arm.

Figure 1:
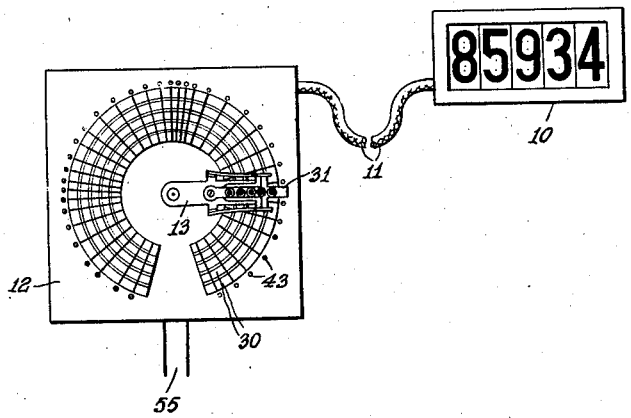
Fig. 1 is a front view of an indicia-displaying device and a selector panel of apparatus embodying the principles of the invention.
Figure 2:
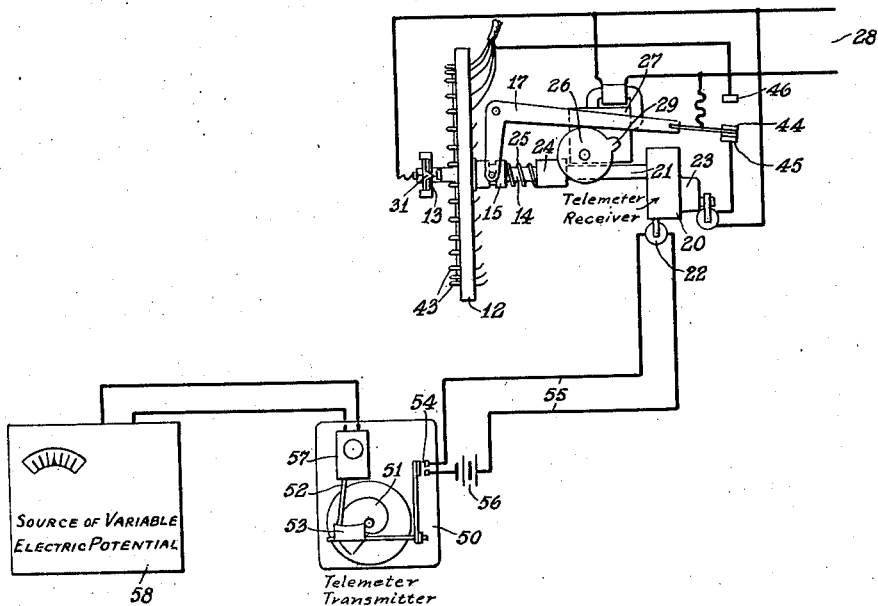
Fig. 2 shows a side view of the said selector, together with a diagrammatic repersentation of associated mechanism, instruments, and electrical circuits essential to the functioning of the apparatus.

Referring to the drawings, 10 designates a display device such as an annunciator or a device similar to that disclosed in U. S. Letters Patent #1,067,629 and of the type wherein definite letters, figures or other indicia, are displayed in response to energization of selected electrical circuits, the conductors for the same being carried preferably in a multi-conductor cable 11 to a selector panel 12. This panel has on its front surface a plurality of concentric, circularly disposed contacts corresponding to the number of indicia to be displayed in the device 10, and each is divided into a plurality of segments corresponding to various indicia which it is desired to display. While the several contact circles need not be divided uniformly, but rather in correspondence with the scalar magnitudes which it is desired to represent by groupings of numerals or indicia, it is understood that in general the respective circles will have similar divisions, separated by radial slots or insulation.

The selector means includes, also, a radial contact-arm 13 adapted to sweep over the contact circles; and the same is fixed to a shaft 14 centrally disposed with respect to the contact circles and passing through the panel 12 to the rear where it carries a collar 15, which is adapted to be fixed to the shaft and has provided therein a peripheral grove 16. A lever 17 swinging about an axis 18 perpendicular to that of the shaft 14, carries a pin 19 which enters the groove 16 and engages the sides thereof in such a manner that by angular motion of the lever 17 about its axis 10, the collar 15, and with it the shaft 14 and radial contact-arm 13, may be given a limited movement in a sense axial to the shaft 14, whereby the contact-arm 13 may be caused to approach and recede from the contact circles on the panel 12.

There is associated with the selector means a telemeter receiver mechanism 20, preferably of the type set forth in U. S. Letters Patent No. 2,040,918, granted to applicant's assignee May 19, 1936, the same being arranged to position a shaft 21 angularly in response to the relative durations of electrical impulses in an actuating magnet 22, the said shaft to be operatively driven by a constant-speed motor 23. The said shaft 21, moreover, is permanently located in coaxial relationship to the shaft 14, and is mechanically engaged therewith through a splined coupling 24 which permits axial motion of the shaft 14, as actuated by the lever 17, without disturbing the angular relation between the two shafts. A compression spring 25, interposed between the collar 15 and the coupling 24, tends to urge said collar and coupling apart, thus holding the rotatable arm 13, attached to the shaft 14 in a position to permit free rotation with said shaft.

The lever arm 17 rests in engagement with a cam member 26, constantly driven at a slow speed (for example, one revolution in 90 seconds) by a constant speed motor 27 energized from the power mains 28. This cam has a contour conformed so that during the greater part of its revolution the lever arm 17 is in a position to maintain the contact-arm 13 in its plane of free rotation with the shaft 14, and includes a short lobe 29, which acts to lift the arm 17, moving thereby the collar 15 and the shaft 14 against the influence of the spring 25 and bringing the contact-arm 13 into operative engagement with the contact circles and the contact segments forming elements thereof.

One form which these contact segments with cooperating contact arm and associated parts may take is shown in considerable detail in Figs. 3 to 5, inclusive. As indicated therein, the contact rings above referred to are composed of segments 30 arranged in circles concentric with each other and with the axis of rotation of the shafts 14 and 21. The segments are separated by radial slots 30', whereby between each pair of adjacent slots there are disposed in radial relation separate segments constituting a group corresponding in number to the number of contact rings.

The arm 13 fixed to the shaft 14 bears toward its radial extremity a contact member 31, pivotally mounted on the arm 13 in a sense to permit of its limited movement in the plane of rotation of said arm and relatively thereto. It carries, also, a plurality of contact fingers 32, yieldingly maintained by springs 33 to engage the segments 30 when the arm 13 is in its depressed position. The said contact member 31 bears two extended portions 34 and 35 against which bear leaf springs 36 and 37 carried by abutments 38 and 39 upon the arm 13. Stops 40 and 41, also borne by the arm 13, serve to limit the action of the leaf springs, so that when the springs are engaged, each with its corresponding stop, the contact member 31 will be maintained in its middle position, with its contact fingers disposed substantially radially of the contact circles, and thus adapted to engage but a single group of segments.

Carried upon the radial extremity of the contact member 31 is a knife-edge member 42, having its knife-edge portion 42' extending in a direction radial to the arm 13. Adapted for coaction therewith is a plurality of pins 43, fixed in the panel 12 in radial alignment with the respective slots 30' between groups of contact segments, and having conical points 43' terminating in a common plane parallel to that of the surface of the panel. The relative disposition of the knife-edge member and the pins is such that when the arm 13 is maintained in its position of free rotation, the knife-edge sweeps clear of the pins and does not engage the same. When by action of the lobe 29 of the cam 26 on the arm 17 the arm 13 is depressed, the knife-edge passes below the plane of the pins, so that should one of the latter be engaged by said knife-edge during its movement toward the panel, the contact member 31 will be forced to one side to an extent that none of the contact fingers carried thereby may bridge the slot between two adjacent groups of contact segments and effect undesirable confusion of electrical connections. As the contact member 31 is moved relatively to the arm 13, one or other of the springs 36, 37 will yield; and when the arm 13 reverts to its normal position and the knife-edge disengages the pin, said spring will at once return the contact member to its normal intermediate position relative to the arm 13.

Carried by the arm 17 is a contact member 44, adapted to engage either of two contact members 45 and 46, according to the position of the arm 17 as governed by the cam 26. With the arm 17 in its normal position, and the arm 13 free to be rotated by the shaft 14, contacts 44 and 45 are in engagement, serving to complete an electrical circuit from the source of supply 28 through the winding of motor 23. This will maintain the receiver mechanism 20 in its normal operating condition, whereby the arm 13 and the contact member carried thereby may be positioned in accordance with the relative durations of impulses applied to the electromagnet 22.

When, however, the arm 17 is lifted by the lobe 29 on the cam 26, contacts 44 and 45 are separated, interrupting the circuit to the telemeter receiver motor 23 and allowing it to come to rest, so that the mechanism will not be submitted to undesirable strains while the contact member 31 is restrained from rotation and the fingers 32 are pressed into engagement with the segments 30. While the arm 17 is at its extreme position, as determined by the dwell of lobe 29, contact 44 will be in engagement with contact member 46, completing a circuit through the selector system, including the contact fingers 32, the contact segments 30, and the operating elements of the exhibiting device 10, whereby there is displayed a group of indicia corresponding to the angular position of the arm 13 at the time the arm 17 was engaged by the lobe 28.

Electrical impulses for actuating the telemeter receiver mechanism 20 are derived from a telemeter transmitter instrument 50 of the impulse class, preferably of the type disclosed and claimed in U. S. Reissued Letters Patent No. 19,039 to K. Wilde. In the particular embodiment shown, a spiral cam member 51 continuously driven by a constant speed motor (not shown) periodically engages a pointer 52 deflecting angularly in response to a measured magnitude, and thereby actuates a rocker plate 53, whereby contacts 54 in an electrical circuit 55 supplied from a source of power 56, establish impulses of current from said source and having durations representative of the position of the pointer 52. By the telemeter receiver mechanism 20, as above set forth, these impulses are translated into angular deflections of the arm 13, representative of the deflections of the pointer in the transmitting instrument 50.

The measuring element of this instrument may take the form of a flow meter, liquid level meter, an instrument for determining electrical magnitudes, or any device wherein a magnitude is represented by deflections of a pointer or the like. The instrument is represented in the drawings as having its pointer 52 actuated from an electrical movement 51, whereby the pointer takes up a position representative of an electrical potential difference derived from a source 58, which may be subject to such variations as would normally occur in a commercial or industrial magnitude, or to manually controlled variations, or to changes attendant upon the operation of an automatic computing circuit, etc.

I claim:

1. In a system for exhibiting the values of a variable and including means for measuring said variable and transmitting the values thereof to a receiver instrument having a motor, and an electrically actuated device for displaying the transmitted values: selector means positioned by said receiver instrument and embodying a multiposition switch having a plurality of stationary contact members and a movable contact element normally out of engagement with the same and adapted to be positioned for selective engagement therewith by said receiver instrument motor, a circuit for said switch and including said contact members and the display device, means for periodically effecting engagement between the movable contact element and selected ones of said stationary contact members as determined by said receiver instrument, circuit controlling means operated by said engagement-effecting means for interrupting the source of power for said receiver instrument motor as said contact element and contacts approach engagement, and further circuit controlling means operated by said engagement-effecting means for energizing said switch and display device when said contact members and movable contact element are in engagement.

2. In a system for exhibiting the values of a variable and including means for measuring said variable and transmitting the values thereof to a receiver instrument having a motor, and an electrically actuated device for displaying the transmitted values: selector means positioned by said receiver instrument and embodying a multiposition switch having a plurality of stationary contact members and a movable contact element, together with resilient means normally maintaining the contact members and contact element out of engagement with each other, said contact element being adapted to be positioned for selective engagement with the stationary contact members by said receiver instrument motor, a circuit for said switch and including said contact members and the display device, means for periodically overcoming the force of said spring to effect engagement between the movable contact element and selected ones of said stationary contact members as determined by said receiver instrument, circuit controlling means operated by said engagement-effecting means for interrupting the source of power for said receiver instrument motor as said contact element and contacts approach engagement, and further circuit controlling means operated by said engagement-effecting means for energizing said switch and display device when said contact members and movable contact element are in engagement.

3. In a system for exhibiting the values of a variable and including means for measuring said variable and transmitting the values thereof to a receiver instrument having a motor, and an electrically actuated device for displaying the transmitted values: selector means positioned by said receiver instrument and embodying a multi-position switch having a plurality of stationary contact members and a movable contact element normally out of engagement with the same and adapted to be positioned for selective engagement therewith by said receiver instrument motor, a circuit for said switch and including said contact members and the display device, a continuously rotating cam for periodically effecting engagement of said movable contact element with selected ones of said contact members as determined by the receiver instrument, circuit controlling means operated by said cam for interrupting the source of power to said receiver instrument motor as said contact element and contacts approach engagement, and further circuit controlling means operated by said cam for energizing said switch and display device when said contact members and movable contact element are in engagement.

HAROLD E. ALLEN.